May 19, 1970 E. D. WOLLEY 3,513,367

HIGH CURRENT GATE CONTROLLED SWITCHES

Filed June 30, 1969 3 Sheets-Sheet 1

WITNESSES

Bernard R. Gieguez

Ronald M. Winegar

INVENTOR

Elden D. Wolley

BY

C. L. Menzemer

ATTORNEY 3,513,367

HIGH CURRENT GATE CONTROLLED SWITCHES

Elden D. Wolley, Monroeville, Pa., assignor to Westinghouse Electric Corporation, Pittsburgh, Pa., a corporation of Pennsylvania Continuation-in-part of application Ser. No. 710,846, Mar. 6, 1968. This application June 30, 1969, Ser. No. 837,732
Int. Cl. H01l *11/10*
U.S. Cl. 317—235 14 Claims

ABSTRACT OF THE DISCLOSURE

A four region gate controlled switch consisting of first emitter, first base, second base and second emitter regions, has a large first emitter area to which a high current capacity electrical contact can be affixed. A selected area of the switch beneath a predetermined portion of the high current capacity electrical contact to the first emitter region has the minority carrier lifetime selectively reduced in order to lower the transport factor, or factors, in either one, or both of the base regions of the switch.

CROSS REFERENCE TO RELATED PATENT APPLICATIONS

This patent application is a continuation-in-part of the copending application Ser. No. 710,846 filed on Mar. 6, 1968, now abandoned.

BACKGROUND OF THE INVENTION

Field of the invention

This invention provides a high current gate controlled switch and a process for producing the same.

Description of the prior art

During gate turn-off of a gate controlled switch, carriers are initially removed from zones of the device adjacent to the gate contact. The central portion of the device continues to conduct during the finite time required for removal the carriers from the zones nearer the gate contacts. Thus, the turn-off starts at the edge of the first emitter which is laterally displaced with respect to and adjacent the gate and proceeds toward the center of the first emitter. The central portion of the device remains "on" until the extent of the "on" portion is small enough that carriers can be removed by lateral gate current. Until this condition is reached, the current is controlled by the external circuit. The time between the initiation of the gate current and the start of turn-off of the innermost portion of the first emitter is the storage time of the device.

The storage time for a gate controlled switch is dependent upon the emitter strip width of that emitter which is laterally disposed relative to the gate, said emitter hereinafter referred to also as the first emitter. Even more important than the effect of the emitter strip width on the storage time is its effect on the total amount of current which can be controlled. The gate turn-off current must flow through the unmodulated portion of the base next to the first emitter which has already been turned off. The amount of base current which can be used to obtain turn-off multiplied by the unmodulated base resistance cannot be greater than the reverse breakdown voltage of the junction between the first emitter and the adjacent base region, hereinafter referred to as first base region. The amount of power current which can be controlled is roughly inversely proportional to the first power of the emitter strip width. Significantly, for the fabrication of a high current gate controlled switch, the amount of current which can be controlled is directly related to the first power of the emitter strip length. Since a high current gate controlled switch should preferably be operated with a low turn-off gain in order to permit fast turn-off, a major problem in a high current gate controlled switch in which all the desirable features are incorporated is how to arrange the electrical contacts for the device. The first emitter should comprise a region of sufficient size to affix an electrical lead thereto which is capable of carrying large electrical currents. During turn-off this emitter current at the same time should be capable of being squeezed into an area portion of sufficient size which in turn would require a large resistance of the adjacent base and thus would limit the current which be controlled and increase the storage time during turn-off.

An object of this invention is to provide a high current gate controlled semiconductor switch capable of being turned off at currents in excess of 25 amperes.

Another object of this invention is to provide a high current gate controlled semiconductor switch capable of being turned off at currents in excess of 25 amperes in which a material selected from the group consisting of gold, iron, manganese, boron, nickel, phosphorus and copper is employed to control the carrier lifetime of a portion of the body of semiconductor material comprising the switch.

SUMMARY OF THE INVENTION

In accordance with the present invention there is provided a gate controlled switch comprising a body of semiconductor material having four alternate regions of first and second type semiconductivity, a pn junction between each pair of first and second type semiconductivity, and two major opposed surfaces. A first region of first type semiconductivity terminates at one of the two major opposed surfaces and has disposed therein a second region of second type semiconductivity also terminating in the same major opposed surface. A third region of first type semiconductivity terminates at the other of the two major opposed surfaces. A fourth region of second type semiconductivity is disposed between and contacts each of the first and the third regions. Two electrical contacts are disposed on the one of the opposed major surfaces and each contact is in an electrically and thermally conductive relationship with only one of the first and second regions, each region having one contact. A third electrical contact is disposed on the other of the opposed major surfaces in an electrically and thermally conductive relationship with the third region. A first selectively diffused region extends from the one major opposed surface entirely through a portion of the second region, across the pn junction between the first and second regions and into at least a portion of the first region and has distributed throughout at least one minority carrier lifetime reducing material. A second selectively diffused region extends from the other of the two major opposed surfaces entirely through a portion of the fourth region, across the pn junction between the fourth and third regions and into at least a portion of the third region and has distributed throughout at least one minority carrier lifetime reducing material selected from the group consisting of gold, nickel, copper, iron, platinum, zinc, manganese, boron, and phosphorus. The level of concentration of the minority carrier lifetime reducing material of the first and the second selectively diffused regions and the distance between the first and the second selectively diffused regions are such that the sums of the minority carrier transport factors of the first and third regions of semiconductivity within an area defined by a vertical projection of the first selectively diffused region upon the second selectively diffused region is less than unity.

DRAWINGS

In order to better understand the invention reference should be made to the following drawings, in which.

DESCRIPTION OF THE INVENTION

Figure 1:
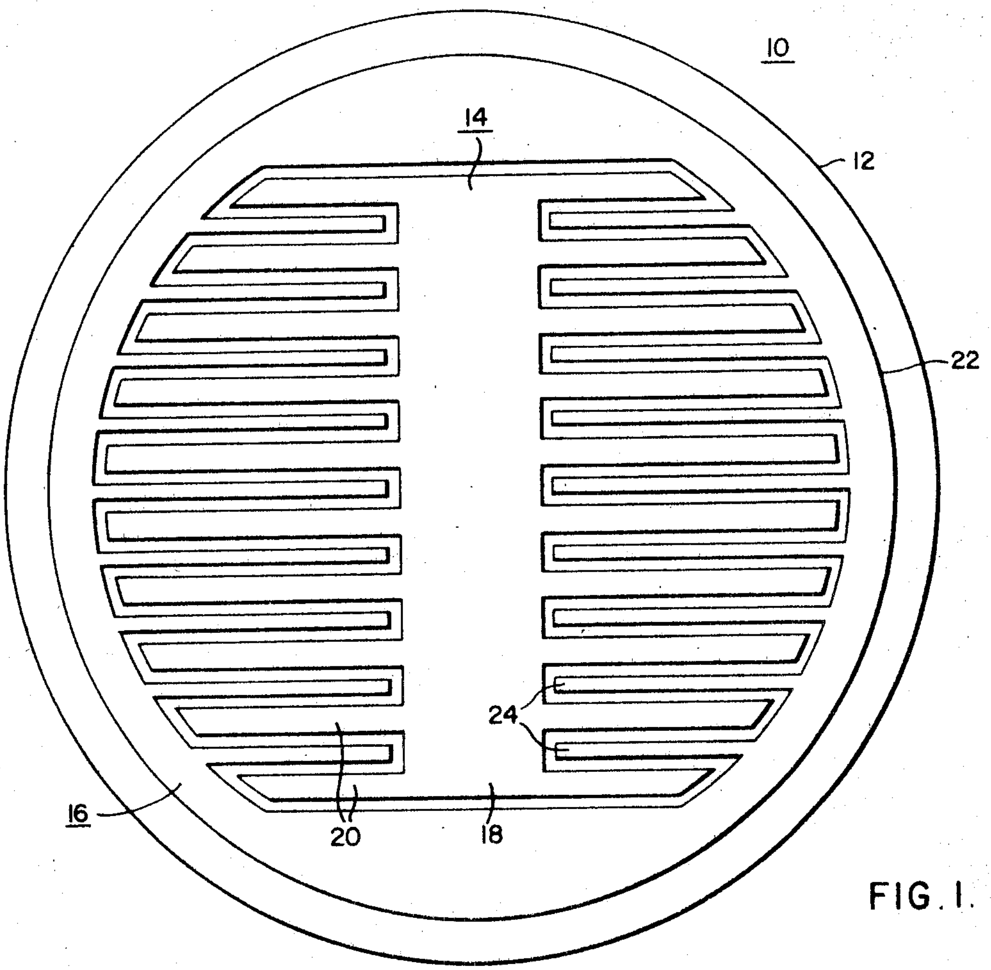
FIG. 1 is a top view of a high current gate controlled semiconductor switch made in accordance with the teachings of this invention.

With reference to FIG. 1 there is shown a high current g te controlled switch 10. The switch comprises a body 12 of semiconductor material, a first electrical, or first emitter, contact 14 and a second electrical, or gate, contact 16. The configuration of each of the contacts 14 and 16 form a comb-like structure.

The first emitter contact 14 consists of a center member 18 and a plurality of integral fingers 20 extending outwardly from the center member 18. The member 18 provides the necessary large area to which a high amperage capacity conductor can be attached as required by high current gate controlled switches.

The gate contact 16 consists of an annular member 22 which is disposed about, and spaced from, the outer periphery of the first emitter contact 14. A plurality of integral fingers 24 extend inwardly from the annular member 22 and are disposed between but spaced apart from adjacent pairs of fingers 20 of the first emitter contact 14.

In conventional thyristors, the portion of the semiconductor body 12 beneath the large-area center member 18 tends to limit the turn-off characteristics of the gate controlled switch or thyristor device. It was found that this problem could be overcome by selectively controlling the minority carrier lifetime in that area portion of the semiconductor body 12 which is beneath the large-area center member 18 of the first emitter contact 14. Selective minority carrier lifetime control may be accomplished by selectively diffusing into the body 12 an impurity that will reduce the normal minority carrier lifetime. Suitable lifetime reducing impurities are gold, nickel, copper, iron, platinum, zinc, and manganese. A modified technique found to alleviate the problem of limited turn-off characteristics resulting from the large-area center member 18 of the first emitter contact 14 involves the establishment of a preferred impurity profile wherein selected portions of the semiconductor body 12 are modified by means of controlled diffusion of those doping impurities that are required to establish a first base region 28 (FIGS. 2, 3 and 4), for example boron if region 28 is a p type conductivity region, or phosphorus if region 28 is an n type conductivity region. Moreover, it is found that the sum of the minority carrier transport factors in those portions of the two base regions, within the area defined by the vertical projection of the aforesaid base regions be less than unity. The minority carrier transport factor of a semiconductor region is defined as the hyperbolic secant of the ratio of region thickness to minority carrier diffusion length.

To better explain the use of the normal lifetime impurities to produce the desired structural features, and for no other reason, the process of making a 50 ampere high current gate controlled switch 10 will be described comprising a body of silicon into which gold has been selectively diffused. The resulting switch will have a pnpn semiconductivity configuration.

The body 12 is prepared from a wafer of silicon semiconductive material which is lapped, polished and etched to a thickness of from 7 to 20 mils (0.17 to 0.5 mm.) depending upon the desired blocking voltage. Preferably the body 12 is round and its preferred initial diameter for a 50 ampere high current gate controlled switch is approximately 0.6 to 0.7 inches (15 to 17.5 mm.). The body 12 has n type semiconductivity of a resistivity of from 15 to 25 ohm-centimeter and a preferred minimum lifetime of from 75 to 100 microseconds.

Figure 2:
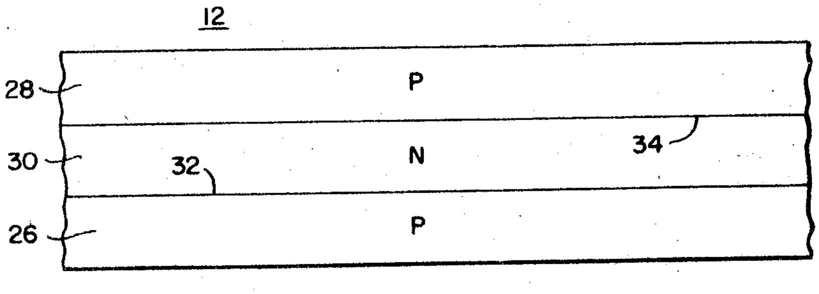
FIGS. 2 through 5 are views in cross-section of a body of semiconductor material being processed in accordance with the teachings of this invention.

With reference to FIG. 2, the body 12 is processed in a suitable manner to form two regions 26 and 28. Preferably the regions 26 and 28 have a low sheet resistance, of the order of from 5 to 20 ohms per square. The regions 26 and 28 may be formed by a two step boron diffusion carried out in an open tube furnace. The body 12 is heated to 1100° C. $B_2O_3$ is the source material and is heated to a temperature of from 850° C. to 950° C. A high purity nitrogen carrier gas flow of approximately 700 cubic centimeters per minute is passed initially across the $B_2O_3$ source and thence over the surfaces of the body 12 until enough boron has been deposited to form a predeposit junction depth of approximately 6 microns with a surface concentration of from 2 to $4\times10^{-19}$ atoms of boron per cubic centimeter.

The predeposited boron is then post-diffused into the body 12 to a predetermined depth. Simultaneously, aluminum is diffused through the same surfaces as the boron into the body 12 obtain the desired blocking junctions. Aluminum is preferred in order to obtain pn junctions exhibiting a high breakover voltage. The aluminum diffusion and boron drive are preformed in a sealed tube furnace under a vacuum of approximately $10^{-5}$ Torr. The aluminum diffusion and boron drive are preferably carried out at a temperature of from 1200° C. to 1210° C. and result in the regions 26 and 28 being from 40 to 45 microns in thickness. The interfaces between the regions 26 and 28 and the remaining region 30 of n type semiconductivity of the body 12 define pn junctions 32 and 34 respectively.

Figure 3:
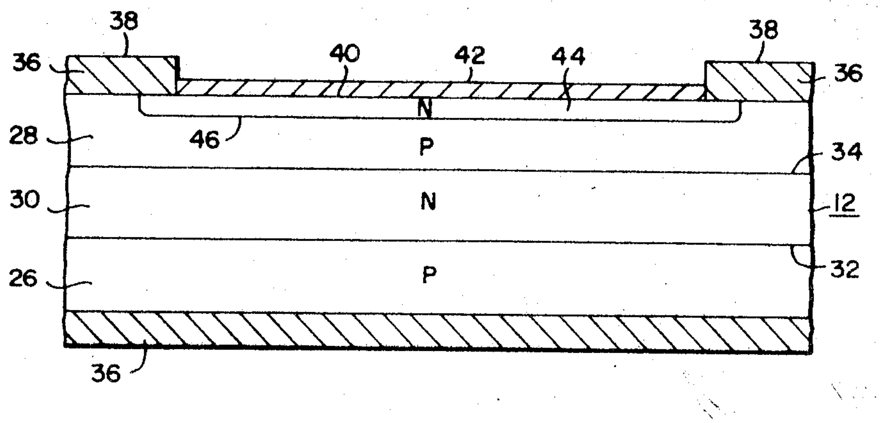

With reference to FIG. 3, a layer 36 of silicon oxide is formed on the body 12 of diffused silicon by such suitable means as subjecting the body 12 to an atmosphere of wet argon at approximately 1200° C. for about four hours. This oxidation process forms a silicon oxide layer which is approximately 17,000 A. in thickness.

In order to form a mask of the first emitter contact 14 on a predetermined portion of the surface 38 of the layer 36, the whole body 12 is covered with an organic monomer or photoresist material which polymerizes when subjected to ultraviolet radiation. Usually, the monomer is applied in liquid form, allowed to dry, and thereafter exposed to ultraviolet light passing through light transmitting areas of an opaque mask. In this process, the pattern defined by the light transmitting areas of the mask becomes polymerized. Washing of the coated body 12 in a suitable solvent for the monomer removes all but the polymerized area of the photosensitive layer exposed to light. The remaining areas, still covered by the polymer, protect the silicon oxide layer 36 during the next process, which is immersion of the wafer in an etchant usually consisting of a mixture of hydrofluoric acid and ammonium floride. The etchant removes the silicon oxide layer 36 from all but the areas covered by the polymer forming a window in the layer 36 and exposing a surface 40 of the body 12. The remaining polymer is removed with a suitable solvent such, for example, as hot sulfuric acid. The body 12 is then washed and dried.

An n type impurity dopant, such for example, as phosphorus, is then predeposited on the surface 40 of the body 12. The phosphorus is predeposited by any suitable means such, for example, as by employment of an open-tube, two zone furnace in which $P_2O_5$ is a source material. The source temperature is 240° C.±2° C. and the body 12 is heated to an elevated temperature of approximately 1100° C. to accomplish a predeposition diffusion. A suitable carrier gas for employment in the furnace is nitrogen having a flow rate of approximately 1200 cubic centimeters per minute.

Upon completion of the impurity predeposit, the body 12 is etched in hydrofluoric acid ($HF:H_2O=1:10$) for 30 seconds to remove the phosphosilicate glass formed on the surface 40 during the predeposition process. The body 12 is then rinsed in deionized water, dried, and placed in a furnace for redistribution, or drive-in, of the predeposited impurity. For phosphorus, a single-zone furnace heated to a temperature of approximately 1200° C. is employed.

A layer 42 of silicon oxide, approximately 5,000 A. in thickness is grown on the surface 40 of the body 12 during the first 15 minutes of the redistribution process. The oxide is formed by such suitable means as bubbling the atmosphere forming gas of the furnace, such, for example, as nitrogen, through water heated to approximately 97° C. to admitting it to the furnace. The flow rate of the nitrogen gas is approximately 200 cc. per minute. After the expiration of the 15 minute period, the redistribution process is continued in an atmosphere of flowing dry nitrogen thereby forming a region of n type semiconductivity in the region 28. The total time required for the redistribution process is dependent upon the design and electrical characteristics desired of the switch. A redistribution time of three hours will most frequently result in an emitter pn junction 46 depth of approximately 10 to 12 microns and a surface sheet resistivity of approximately 0.7 ohm per square where the impurity material is phosphorus which has been predeposited to form a predeposited junction depth of approximately 3.9 microns and having a predeposit sheet resistance of approximately 1.45 ohms per square.

For a detailed description of the gold diffusion process and the result obtainable therefrom one should make reference to my copending application Ser. No. 580,516 which is also assigned to the same assignee of this present invention.

Figure 4:
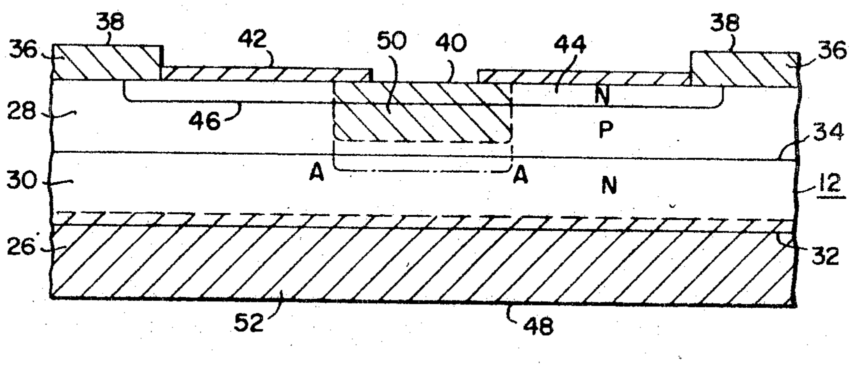

As shown in FIG. 4, the lifetime reducing impurity, e.g. the gold, diffusion is not restricted to one region only. Since the purpose of the diffusion is, i.a., to increase the holding current and decrease the transport factor in the underlying p type base region 28 and also in the n type base region 30, hereinafter referred to as the second base region to distinguish from the first base region 28, the gold diffused regions 52 and 50 must necessarily extend across pn junctions 32 and 46 where applicable.

Since phosphorus tends to retard the diffusion of gold, the region 50 may not always extend across the pn junction 34 when the n type region 44 is a phosphorus-doped region. Extension of the gold diffused region 50 beyond the pn junction 34 (dotted lines A—A, FIG. 4) may be accomplished more easily by doping the region 44 with another n type dopant, such, for example, as arsenic.

Windows are formed in the remaining portions of the layers 38 and 42 of silicon oxide by conventional photoresist techniques as described heretofore. The windows which are formed correspond to the design configuration of the contacts 14 and 16 shown in FIG. 1. The window for center member 18 of the first emitter contact 14 will coincide substantially with the exposed surface of the gold diffused region 50. The necessary electrical contact material is deposited for both the emitter contact 14 and the gate contact 16 at the same time. A suitable electrical material enabling one to make an electrical contact to, and for attaching electrical leads to, the shalow (10–13 micron thickness) n type emitter region 44, without completely penetrating the latter, consists of a combination of aluminum and silver. The aluminum provides a good low resistance electrical contact to both the gate region 28 and to the highly doped emitter region 44. A layer of silver is deposited over the aluminum facilitating the establishment of a good electrical contact to electrical leads for the contacts 14 and 16. The aluminum-silver contacts may be prepared by vapor deposition techniques known to those skilled in the art.

The body 12 is placed in a vacuum evaporation chamber along with a source of aluminum and a source of silver after proper precaution has been taken to mask the sides and the bottom surface of the body 12. The aluminum is placed in a tungsten coil approximately 1¾ inches from the body 12. The silver is placed in the V-shaped trough of a tungsten heater approximately 3 inches from the body 12. A partial vacuum of $5\times10^{-5}$ torr. is established in the chamber. The body 12 is heated to approximately 200° C. and a shield between the aluminum and the body 12 is removed. The aluminum source is then heated to evaporate the aluminum where it travels in part to the body 12 where it is deposited on all surfaces of both the protective mask and the unprotected portions of the various regions of the body. Before all of the aluminum is evaporated, the silver source is heated so that a mixture of aluminum and silver is codeposited at the same time on the body 12. When the codeposition has occurred for a sufficient time, the power to the aluminum source is shut off and only silver is deposited until the desired amount has been deposited. The body 12 is cooled, removed from the chamber and the protective covering is removed from the surface 48 of the region 26.

A "sandwich" is then prepared for an alloying process. The sandwich consists of a disk of an electrical material such, for example, as molybdenum, tungsten, tantalum, and base alloys thereof, an aluminum-silicon foil and the body 12.

The alloying process is carried out at 700° C. for approximately 30 minutes. At this temperature and time the disk is alloyed to the surface 48 of the body 12 and the aluminum of the electrical contact materials is alloyed to the exposed surface 40 of the regions 28 and 42.

Figure 5:
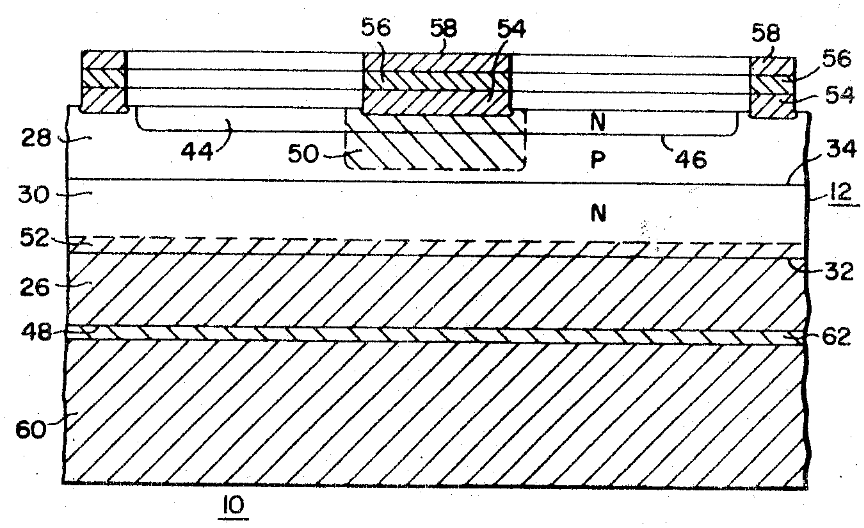

Unwanted aluminum and silver is removed from the body 12, and particularly between the contact windows by employment of photoresist techniques followed by preferential etching. The protective coating is then removed. The side edge of the wafer is then chemically etched to isolate the pn junctions 32 and 34 from each other. With reference to FIG. 5 there is shown the high current rating gate controlled switch 10 made in accordance with the teachings of this invention. The layer of electrical contact material consisting of a layer 54 of aluminum is disposed on, and alloyed to, both regions 28 and 44. A layer 56 of aluminum and silver is deposited on the layer 54 of aluminum. A layer 58 of silver is deposited on the layer 56 of aluminum and silver. An electrical contact 60 is joined to the surface 48 of the body 12 by an aluminum-silicon alloy layer 62.

The device as shown in FIGS. 1 and 5 may be employed in compression bond encapsulation devices or may be so encapsulated wherein electrical leads are soldered to contacts 14 and 16. To facilitate the soldering it is desirable to pretin the contacts 14 and 16 with a layer of a soft solder material.

The device 10 as fabricated is capable of performing as a high performance gate controlled switch with a current handling capability greater than 25 amperes. Its structure is simple enough to enable large current carrying capacity leads to be soldered to it when necessary. It is also less complex and less expensive than a set of bridges required to enable power transistor structures to function in the same manner as the device 10. The device 10 of FIG. 5 is a four region, three junction gate-controlled thyristor, wherein the p region 26, the n region 30, the p region 28 and the n region 44 operate as the anode emitter, second base, first base and cathode emitter regions respectively with the contact 60 and the Al-Ag layer portions 54, 56 and 58 in respective electrical contact with the first base region and the first emitter region serving respectively as anode, gate and cathode contacts, the gate and cathode contacts having the configurations 16 and 14 respectively as shown in FIG. 1.

Although the device shown in FIG. 5 has unsymmetrical regions 50 and 52, the regions 50 and 52 may also be formed symmetrical to each other.

A similar device which functions in the same manner as the device 10 is made by employing a double-diffusion step of boron. In this instance a high current gate controlled switch 110 will have a structure the same as shown in FIGS. 1 and 5 but processing of the body 112 comprising the device 110 is slightly different from that practiced on the body 12 of device 10.

Figure 6:
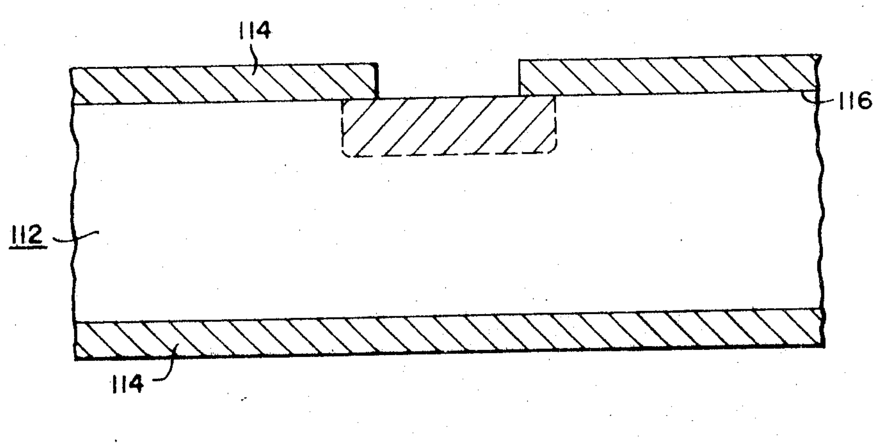
FIG. 6 is a view in cross-section of a body of semiconductor material processed in an alternate manner in accordance with the teachings of this invention.

With reference to FIG. 6 the body 112 comprises the same material and is prepared in the same manner as that of the body 12 previously disclosed. A layer 114 of silicon oxide is formed on the exposed surfaces of the body 112. Employing a photoresist technique, a window is provided in the layer 114 to enable one to perform a selective diffusion into the body 112 to which the center member 18 of the contact 14 is affixed. Boron is predeposited on the exposed portion of a top surface 116 of the body 112 in the same manner as previously described. In making a 50 ampere device, the boron predeposition should produce a predeposited junction 6 microns deep and a surface concentration of from $10^{19}$ to $10^{21}$ atoms of boron per cubic centimeter. The boron is then diffused into the silicon wafer to a depth of from 10 to 15 microns. The layer 114 of silicon oxide is then stripped from the body 112. The body 112 is then processed in the same manner as previously described for the body 12 starting with the predeposition of boron or gallium to form the two p type semiconductivity regions 26 and 28.

Figure 7:
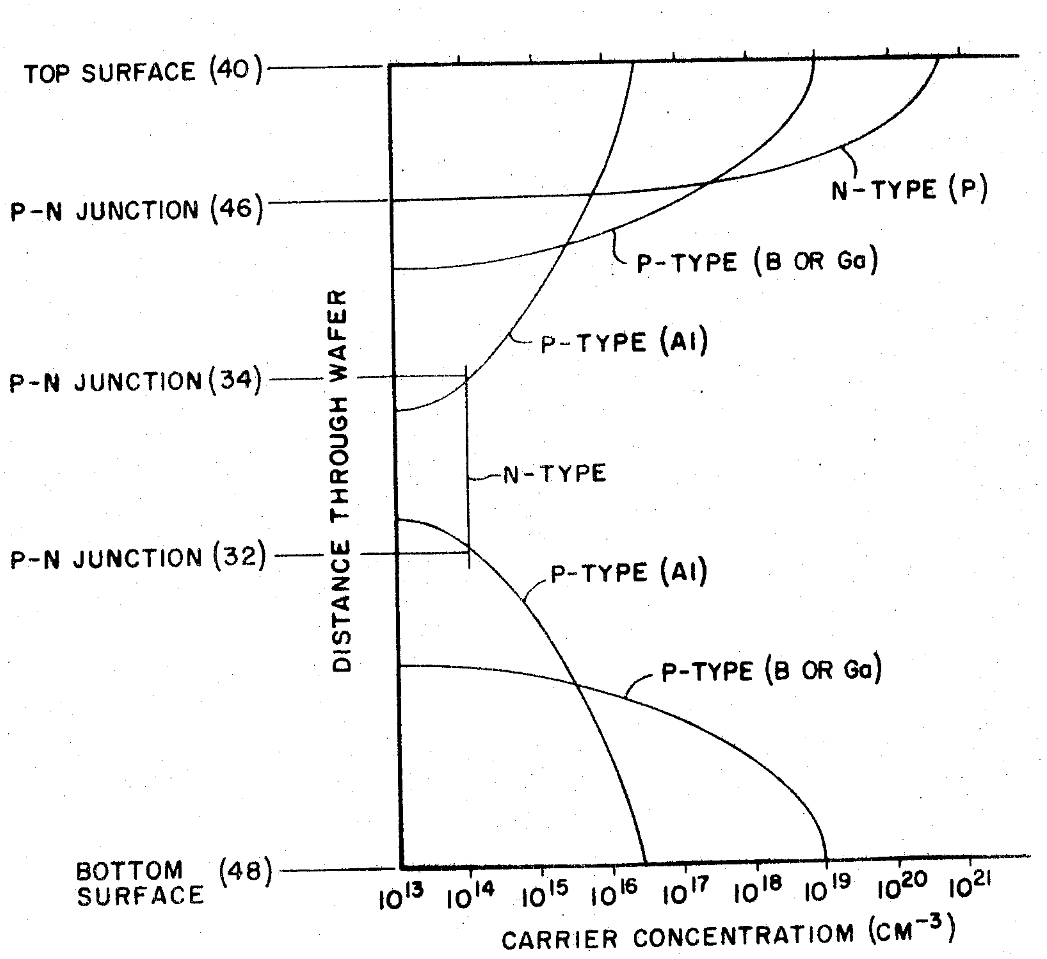
FIG. 7 is an impurity profile of a high current gate controlled switch made in accordance with the teachings of this invention.

Upon completion the 50 ampere device has a region 26, 40 microns in thickness. The region 30 has a thickness of 150 microns and a resistivity of 20 ohm-centimeter. The region 28 has a thickness of 25 microns. The region 44 has a thickness of 12 microns. Contrasted with the embodiment of FIGS. 1 through 5, the deep boron diffused region 50 having a thickness of approximately 30 microns contains boron as the lifetime reducing impurity, the additional presence of another lifetime reducing impurity, e.g., gold, being optional, i.e., gold may be present as impurity in the region 50 and at a surface concentration of $4\times10^{14}$ atoms cm.$^{-3}$. The lifetime reducing impurity (e.g. gold), diffusion through the surface 48 extends to a depth of approximately 3 mils (0.075 mm.) and has a surface concentration of $4\times10^{14}$ atoms cm.$^{-3}$. The diffusion profile, excluding the gold, is shown in FIG. 7. Such a 50 ampere device is capable of being turned off in excess of 50 amperes of load current in 5 microseconds. Turn off gains in excess of 10 are attained.

In designing a high current gate controlled switch care must be taken to prevent the occurrence of the cathode emitter junction 44 at too high a doping impurity concentration, e.g., of the first base region since otherwise the switching characteristics might be affected adversely.

The high concentration of the impurity determining the conductivity type of the first base region in that portion of the first base region that is common with the region 50, in lieu of, or in addition to, other lifetime reducing impurity (e.g., gold) diffusion has the advantage over the sole gold diffusion in region 50 that the lifetime reduction can be more easily restricted to the first base region, thereby reducing the reverse leakage of the forward blocking junction (pn junction 34) of the structure.

I claim as my invention:

1. A gate controlled switch comprising a body of semiconductor material having four alternate regioins of first and second type semiconductivity, a pn junction between each pair of regions of first and second type semiconductivity, and two major opposed surfaces;

a first region of first type semiconductivity terminating at one of the two major opposed surfaces;

a second region of second type semiconductivity disposed within said first region and terminating at said one major surface;

a third region of first type semiconductivity terminating at the other of the major opposed surfaces;

a fourth region of second type semiconductivity disposed between and contacting each of said first and said third regions;

a first electrical contact disposed on said one of two major surfaces in an electrically and thermally conductive relationship with said second region;

a second electrical contact disposed on said other of the two major opposed surfaces in an electrically and thermaly conductive relationship with said third region;

a third electrical contact disposed on said one of two major opposed surfaces in an electrically and thermally conductive relationship with said first region;

a first selectively diffused region extending from said one of two major opposed surfaces entirely through a portion of said second region, and into at least a portion of said first region and across the pn junction between said second and first regions and having distributed throughout at least one minority carrier lifetime reducing material; and a second selectively diffused region extending from said other of the two major opposed surfaces entirely through a portion of said third region, across the pn junction between said fourth and third regions and into at least a portion of said fourth region and having distributed throughout at least one minority carrier lifetime reducing material selected from the group consisting of gold, nickel, copper, iron, platinum, zinc, manganese, boron and phosphorus, whereby the level of concentration of the minority carrier lifetime reducing material of said first and second selectively diffused regions and the distance between said first and said second selectively diffused regions are such that the sum of the minority carrier transport factors of said first and said third regions of semiconductivity within an area defined by a vertical projection of said first selectively diffused region upon said second selectively diffused region is less than unity.

2. The gate controlled switch of claim 1 wherein said first region has p type semiconductivity, and the minority carrier lifetime reducing material of said first selectively diffused region is at least one selected from the group consisting of gold, nickel, copper, iron, platinum, zinc, manganese and boron.

3. The gate controlled switch of claim 1 wherein said first region has n type semiconductivity, and the minority carrier lifetime reducing material is phosphorus.

4. The gate controlled switch of claim 1 wherein said first region has p type semiconductivity, said second region has n type semiconductivity, said third region has p type semiconductivity, said fourth region has n type semiconductivity, and each of said first and said third regions of semiconductinvity is doped with at least one material selected from the group consisting of aluminum, boron, and gallium.

5. The gate controlled switch of claim 4 wherein at least one of said second and said fourth regions of semiconductivity is doped with phosphorus.

6. The gate controlled switch of claim 4 wherein each of said first and said third regions of semiconductivity is doped with both boron and aluminum, and, the minority carrier lifetime reducing material of said first selectively diffused region is boron, and the minority carrier lifetime reducing material of said second selectively diffused region is gold.

7. The gate controlled switch of claim 4 wherein
each of said first and said third regions of semiconductivity is doped with both boron and aluminum, and
the minority carrier lifetime reducing material of said first selectively diffused region is gold, and
the minority carrier lifetime reducing material of said second selectively diffused region is gold.

8. The gate controlled switch of claim 4 wherein
ductivity is doped with both boron and aluminum,
each of said first and said third regions of semicon- and
the minority carrier lifetime reducing material of said second selectively diffused region is gold.

9. The gate controlled switch of claim 5 wherein
each of said first and said third regions of semiconductivity is doped with both boron and aluminum, and
the minority carrier lifetime reducing material of said first selectively diffused region is boron, and
the minority carrier lifetime reducing material of said second selectively diffused region is gold.

10. The gate controlled switch of claim 5 wherein
each of said first and said third regions of semiconductivity is doped with both boron and aluminum, and
said first selectively diffused region has two minority carrier lifetime reducing materials distributed throughout the region, the first minority carrier lifetime reducing material being boron and the second minority carrier lifetime reducing material is gold, and
the minority carrier lifetime reducing material of said second selectively diffused region is gold.

11. The gate controlled switch of claim 5 wherein
each of said first and said third regions of semiconductivity is doped with both boron and aluminum, and
the minority carrier lifetime reducing material of said first selectively diffused region is boron and gold, and
the minority carrier lifetime reducing material of said second selectively diffused region is gold.

12. The gate controlled switch of claim 7 wherein said first selectively diffused region extends entirely through a portion of said first region of semiconductivity, across the pn junction between said first and said fourth regions of semiconductivity and into at least a portion of said fourth region of semiconductivity.

13. The gate controlled switch of claim 10 wherein said first selectively diffused region extends entirely through a portion of said first region of semiconductivity, across the pn junction between said first and said fourth regions of semiconductivity and into at least a portion of said fourth region of semiconductivity.

14. The gate controlled switch of claim 4 wherein
each of said first and said third regions of semiconductivity is doped with gallium and aluminum, and
the minority carries lifetime reducing material of said first selectively diffused region is boron.

References Cited

UNITED STATES PATENTS

| | | | |
|---|---|---|---|
| 3,260,901 | 7/1966 | Luescher et al. | 317—235 |
| 3,437,889 | 4/1969 | Eugster | 317—235 |
| 3,440,113 | 4/1969 | Wolley | 317—235 X |

JAMES D. KALLAM, Primary Examiner

U.S. Cl. X.R.

317—234